United States Patent
Campbell et al.

(10) Patent No.: US 7,424,278 B2
(45) Date of Patent: Sep. 9, 2008

(54) LOW IF MIXER WITH IMPROVED SELECTIVITY PERFORMANCE

(75) Inventors: Edward E. Campbell, Blandon, PA (US); Syed Aon Mujtaba, Berkeley Heights, NJ (US)

(73) Assignee: Agere Systems Inc., Allentown, PA (US)

( * ) Notice: Subject to any disclaimer, the term of this patent is extended or adjusted under 35 U.S.C. 154(b) by 481 days.

(21) Appl. No.: 11/022,317

(22) Filed: Dec. 23, 2004

(65) Prior Publication Data

US 2006/0141974 A1    Jun. 29, 2006

(51) Int. Cl.
*H04B 1/18* (2006.01)

(52) U.S. Cl. ............ 455/179.1; 455/310; 455/192.2; 455/192.1; 375/344; 375/327

(58) Field of Classification Search ......... 455/318, 455/192.1, 192.2, 173.1, 182.2, 424, 425, 455/67.11, 63.1, 164.2, 255, 257, 256, 278.1, 455/285, 258, 550.1, 575.1, 561, 296, 324, 455/179.1, 456.5, 456.6, 302, 310; 375/344, 375/327, 316, 337, 140, 129, 345
See application file for complete search history.

(56) References Cited

U.S. PATENT DOCUMENTS

| | | | | |
|---|---|---|---|---|
| 5,416,422 | A * | 5/1995 | Dildine | 324/614 |
| 6,707,858 | B1 * | 3/2004 | Davie | 375/316 |
| 6,785,529 | B2 * | 8/2004 | Ciccarelli et al. | 455/324 |
| 7,221,917 | B2 * | 5/2007 | Kroeger | 455/192.2 |
| 2001/0006542 | A1 * | 7/2001 | Ozeki et al. | 375/345 |
| 2003/0072393 | A1 * | 4/2003 | Gu | 375/322 |
| 2005/0143038 | A1 * | 6/2005 | Lafleur | 455/296 |

* cited by examiner

*Primary Examiner*—Edward Urban
*Assistant Examiner*—Charles Chow
(74) *Attorney, Agent, or Firm*—Ryan, Mason & Lewis, LLP

(57) ABSTRACT

A low IF mixer and method for down-converting a signal at a desired frequency are disclosed with improved selectivity performance. The energy of sidebands on each side of the desired frequency is evaluated; and a local oscillator frequency is selected based on the evaluation of the energy. Generally, the local oscillator frequency associated with the sideband having a lower energy is selected. The desired frequency may have a frequency of RF and the sidebands have a frequency of the desired frequency plus or minus an offset frequency (RF+IF or RF−IF). The signal at the desired frequency may be multiplied by the selected local oscillator frequency to down-convert the signal.

13 Claims, 3 Drawing Sheets

LOW IF MIXER WITH IMPROVED SELECTIVITY PERFORMANCE

FIELD OF THE INVENTION

The present invention relates generally to wireless communication systems, such as wireless local area networks (WLANs), and more particularly, to a low IF mixer for down-conversion of a received signal.

BACKGROUND OF THE INVENTION

Low Intermediate Frequency (LIF) receivers have been proposed for use in wireless networks to provide improved sensitivity and noise characteristics. Generally, communication signals are transmitted at a desired frequency, $f_o$, obtained by multiplying the original base band signal by a carrier frequency. In a Low-IF receiver, the desired frequency, RF, is first down-converted to an intermediate frequency, IF, so that the unwanted DC content can be filtered out, before further down conversion is performed to the information carrying base band signal, in a known manner. The down-conversion process at the receiver causes adjacent channel interference (ACI) at a frequency of LO–IF, as shown in FIG. 1.

These partial images of the desired frequency signal on each side of the desired frequency cannot be filtered out. Thus, following the down conversion process, the adjacent channel interference will cause distortion in adjacent channels (i.e., increased out-of-channel energy). Thus, Low-IF receivers are said to exhibit poor performance for handling adjacent signals. Nonetheless, Low-IF receivers demonstrate superior sensitivity since they do not suffer from in-channel distortion, such as DC offset and IQ imbalance distortion. A need therefore exists for a low IF receiver that exhibits improved adjacent channel rejection.

SUMMARY OF THE INVENTION

Generally, a low IF mixer and method for down-converting a signal at a desired frequency are disclosed with improved selectivity performance. The energy of sidebands on each side of the desired frequency is evaluated; and a local oscillator frequency is selected based on the evaluation of the energy. Generally, the local oscillator frequency associated with the sideband having a lower energy is selected. The desired frequency may have a frequency of RF and the sidebands have a frequency of the desired frequency plus or minus an offset frequency (RF+IF or RF−IF). The signal at the desired frequency may be multiplied by the selected local oscillator frequency to down-convert the signal.

A more complete understanding of the present invention, as well as further features and advantages of the present invention, will be obtained by reference to the following detailed description and drawings.

DETAILED DESCRIPTION

Figure 1:
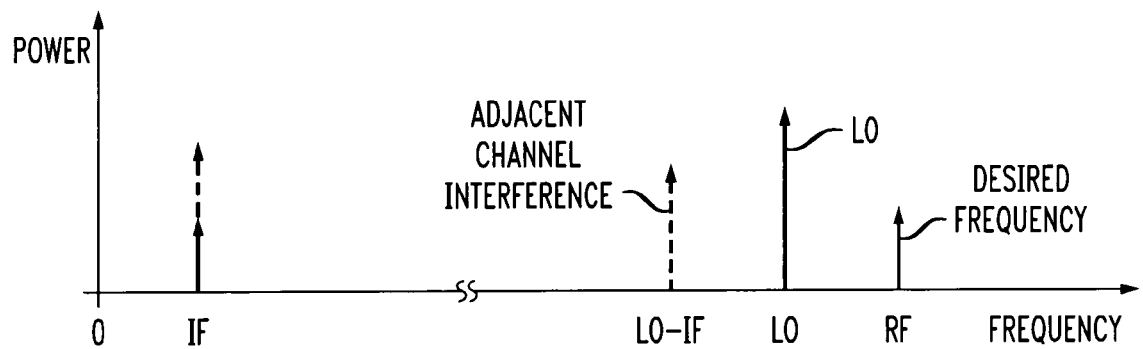
FIG. 1 illustrates the frequency spectrum prior to down-conversion at the receiver.
Figure 2:
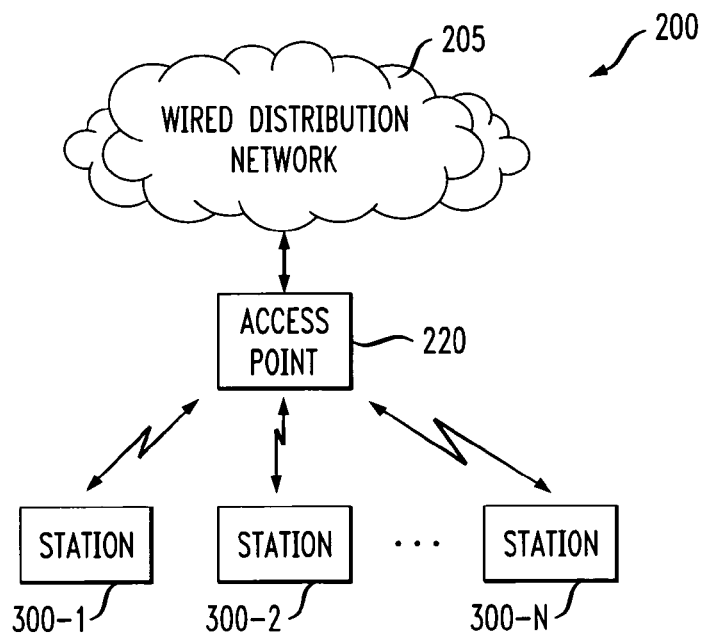
FIG. 2 illustrates a wireless network environment in which the present invention can operate.

FIG. 2 illustrates a wireless network environment 200 in which the present invention can operate. The wireless network environment 200 may be, for example, a wireless LAN or a portion thereof. As shown in FIG. 2, a number of stations 300-1 through 300-N, collectively referred to as stations 300 and discussed below in conjunction with FIG. 3, communicate over one or more wireless channels in the wireless digital communication system 200. An access point 220 is typically connected to a wired distribution network 205 with other access points (not shown). The access point 220 typically provides control and management functions, in a known manner. In addition, the access point 220 acts as a central node through which all traffic is relayed so that the stations 300 can rely on the fact that transmissions will originate from the access point 220. The wireless network environment 200 may be implemented, for example, in accordance with the IEEE 802.11 standard or the various extensions to the 802.11 standard, such as 802.11a, b and g, or the HIPERLAN/2 standard.

The exemplary IEEE 802.11 protocol specifies that all communications are relayed via the access point 220, so each transmission that is of interest (other access points 220 may be active on the same radio channel) is from the access point 220 the stations 300 is associated with. An example of such a communications protocol is the Basic Service Set (BSS) mode of the IEEE 802.11 protocol, in which stations 300 are associated with an access point 220 that relays all communication. An alternate scenario is the Independent Basic Service Set (IBSS) where two stations can directly communicate.

Thus, typically, a station 300 has associated with a nearby access point 220 and has been assigned a channel for the link. Another nearby AP (not shown) will typically be operating on an adjacent channel. The station 300 could actually be in a location where the unwanted adjacent channel signal from the neighboring access point 220 or another client is actually stronger than the wanted signal from the access point 220 in the link, referred to as the Near-Far Problem.

Figure 6:
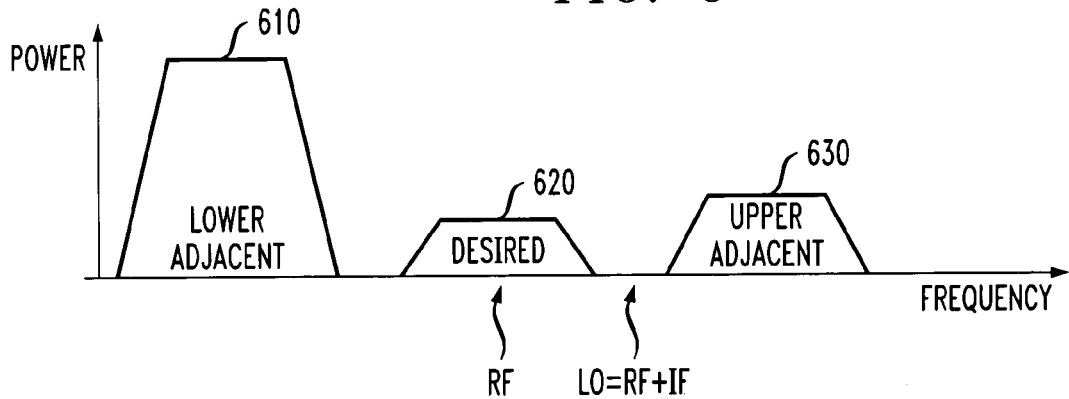

The present invention recognizes that in most Wireless LAN environments, however, the long-term average of upper/lower adjacent channel interference shows unequal energy levels, with one of the adjacent channels being a more dominant source of interference. This is illustrated in FIG. 6, where the exemplary lower adjacent channel interference has a higher energy level than the upper adjacent channel interference.

According to one aspect of the invention, a receiver 300 employs a low IF mixer 400, as discussed further below in conjunction with FIG. 4, that exhibits improved adjacent channel rejection. As discussed hereinafter, the receiver scans the energy in the upper and lower adjacent channels and selects the Local Oscillator (LO) frequency for down-conversion based on the adjacent channel that has the lower interference.

Figure 3:
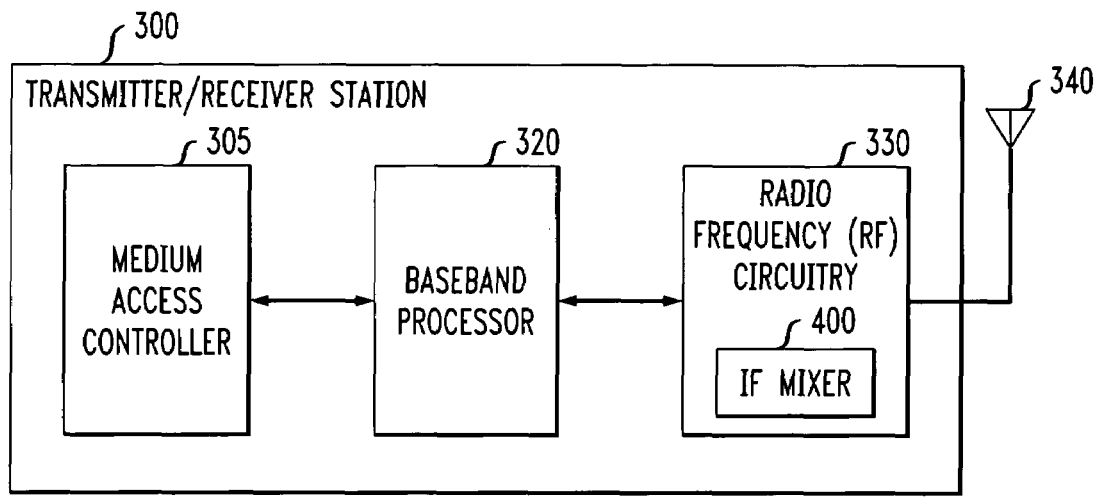
FIG. 3 is a schematic block diagram of an exemplary transmitter/receiver station incorporating features of the present invention.

FIG. 3 is a schematic block diagram of an exemplary transmitter/receiver station 300 (or alternatively, an access point 220) incorporating features of the present invention. The stations 300 may each be embodied, for example, as personal computer devices, or any device having a wireless communication capability, such as a cellular telephone, personal digital assistant or pager, as modified herein to provide the features and functions of the present invention. As shown in FIG. 3, a signal is received by an antenna 340 that provides the signal to RF circuitry 330. As shown in FIG. 3, the RF circuitry 330 includes a low IF mixer 400, as discussed further below in conjunction with FIG. 4, that operates during the down conversion to baseband, before the signal is applied to a baseband processor 320. Thereafter, the baseband signal is supplied to a Medium Access Controller (MAC) 305.

Figure 4:
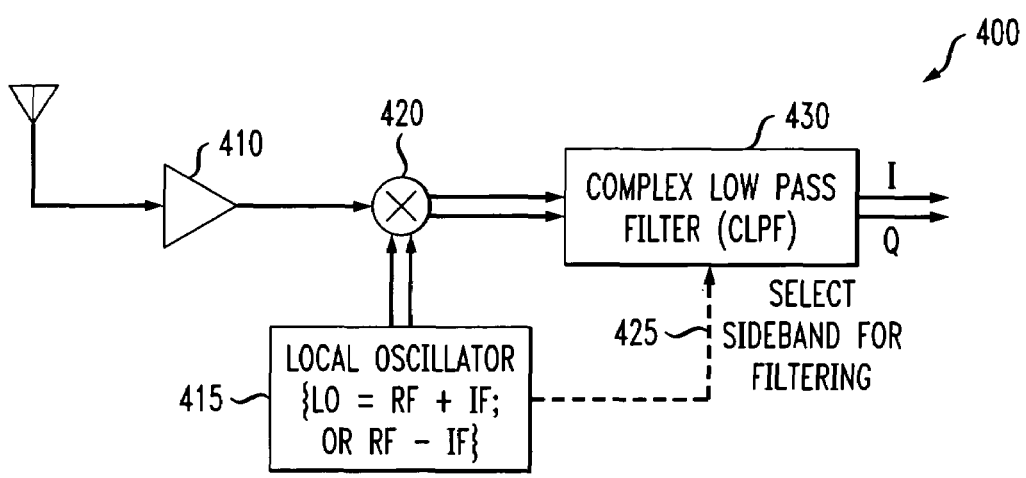
FIG. 4 is a schematic block diagram of a low IF mixer incorporating features of the present invention.

FIG. 4 is a schematic block diagram of a low IF mixer 400 incorporating features of the present invention. The low IF mixer 400 provides a selectable Upper/Lower Sideband of operation, whereby the LO frequency of the upper or lower sidebands is selected for down-conversion based on the upper or lower adjacent channel having the lower interference.

As shown in FIG. 4, the low IF mixer 400 includes an amplifier 410 that amplifies the received signal. A local oscillator 415 generates an LO signal of either RF+IF or RF−IF. As discussed below in conjunction with FIG. 7, the local oscillator 415 generates the LO signal based on a scan of the energy in the upper and lower sidebands. The upper or lower sideband having the lowest interference is selected and the corresponding LO frequency is generated. The amplified received signal and the generated LO signal are applied to a multiplier 420. The output of the multiplier 420 is filtered by a complex low pass filter 430, based on the selected sideband 425.

Thus, the low IF mixer 400 has a selectable upper/lower sideband of operation. The upper or lower sideband is selected based on the upper and lower sidebands having the lowest measured ACI. In this manner, the selectivity performance of the LIF receiver is improved over a receiver with a sideband of operation.

Figure 5:
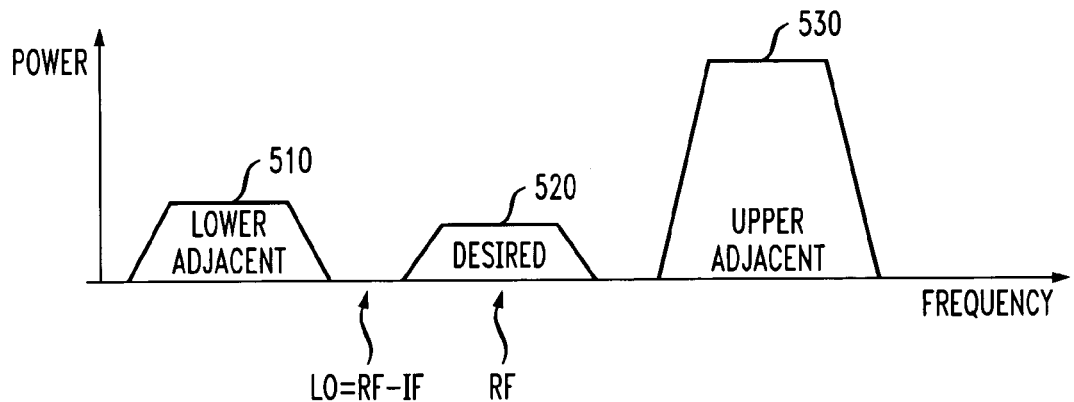
FIGS. 5 and 6 illustrate the RF power as a function of frequency.

FIG. 5 illustrates the RF power as a function of frequency, where the ACI of the upper sideband 530 is higher than the ACI of the lower sideband 510 as determined by the energy scan of the sidebands (first scenario). As discussed below in conjunction with FIG. 7, the low IF mixer 400 then chooses a local oscillator frequency of RF−IF such that the receiver image is then placed in the lower adjacent channel where the energy level is lower, effectively giving the receiver improved selectivity performance. In other words, the LO frequency is selected just below the desired channel band.

FIG. 6 illustrates the RF power as a function of frequency, where the ACI of the lower sideband 610 is higher than the ACI of the upper sideband 630, as determined by the energy scan of the sidebands (second scenario). As discussed below in conjunction with FIG. 7, the low IF mixer 400 then chooses a local oscillator frequency of RF+IF such that the receiver image is then placed in the upper adjacent channel where the energy level is lower, effectively giving the receiver improved selectivity performance. In other words, the LO frequency is selected just above the desired channel band.

Figure 7:
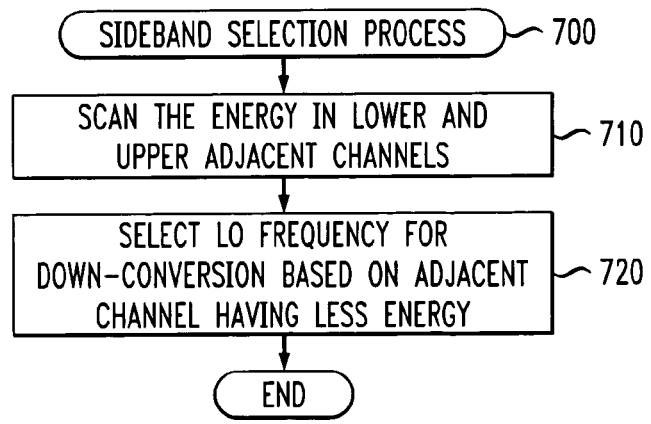
FIG. 7 is a flow chart describing an exemplary sideband selection process for selecting the upper or lower sideband in the low IF mixer of FIG. 4.

FIG. 7 is a flow chart describing an exemplary procedure for selecting the upper or lower sideband in the low IF mixer 400 of FIG. 4. As shown in FIG. 7, the sideband selection process 700 initially scans the energy in the lower and upper adjacent channels during step 710. Thereafter, the LO frequency is selected for down-conversion during step 720 based on the adjacent channel having the lowest energy.

It is noted that while the sideband selection process 700 is illustrated as a flow chart, the selection algorithm can also be implemented in hardware, as would be apparent to a person of ordinary skill in the art.

It is to be understood that the embodiments and variations shown and described herein are merely illustrative of the principles of this invention and that various modifications may be implemented by those skilled in the art without departing from the scope and spirit of the invention.

We claim:

1. A method for down-converting a signal at a desired frequency to a low IF frequency, comprising the steps of:
   evaluating an energy of first and second sidebands on each side of said desired frequency;
   selecting a local oscillator frequency substantially equal to a frequency of one of said first and second sidebands having a lower energy;
   multiplying said signal at said desired frequency by said selected local oscillator frequency to generate said signal at said low IF frequency; and
   filtering said signal at said low IF frequency using a low pass filter.

2. The method of claim 1, wherein said desired frequency is RF and a first of said sidebands has a frequency of said desired frequency plus an offset frequency RF+IF.

3. The method of claim 1, wherein said desired frequency is RF and a second of said sidebands has a frequency of said desired frequency minus an offset frequency RF−IF.

4. The method of claim 1, wherein said filtering step is performed using a complex low pass filter.

5. A low IF mixer, comprising:
   a port for receiving a signal at a desired frequency;
   a multiplier for multiplying said received signal at a desired frequency by a local oscillator frequency to generate a signal at a low IF frequency, wherein said local oscillator frequency is substantially equal to a frequency of one of first and second adjacent sidebands to said desired frequency having a lower energy; and
   a low pass filter for filtering said signal at said low IF frequency.

6. The low IF mixer of claim 5, wherein said desired frequency is RF and a first of said sidebands has a frequency of said desired frequency plus an offset frequency RF+IF.

7. The low IF mixer of claim 5, wherein said desired frequency is RF and a second of said sidebands has a frequency of said desired frequency minus an offset frequency RF−IF.

8. The low IF mixer of claim 7, further comprising a filter that filters an output of said multiplier.

9. The low IF mixer of claim 8, wherein said low pass filter is a complex low pass filter.

10. A receiver in a wireless network, comprising:
    an antenna for receiving a signal at a desired frequency;
    a low IF mixer having a multiplier for multiplying said received signal at a desired frequency by a local oscillator frequency to generate a signal at a low IF frequency, wherein said local oscillator frequency is substantially equal to a frequency of one of first and second adjacent sidebands to said desired frequency having a lower energy; and
    a low pass filter for filtering said signal at said low IF frequency.

11. The receiver of claim 10, wherein said desired frequency is RF and a first of said sidebands has a frequency of said desired frequency plus an offset frequency RF+IF.

12. The receiver of claim 10, wherein said desired frequency is RF and a second of said sidebands has a frequency of said desired frequency minus an offset frequency RF−IF.

13. The receiver of claim 10, wherein said low pass filter is a complex low pass filter.

* * * * *